United States Patent
Suzuki et al.

(10) Patent No.: US 7,271,514 B2
(45) Date of Patent: Sep. 18, 2007

(54) ROTOR STRUCTURE

(75) Inventors: Kenta Suzuki, Yokohama (JP);
Hirofumi Shimizu, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/095,527

(22) Filed: Apr. 1, 2005

(65) Prior Publication Data
US 2005/0218751 A1    Oct. 6, 2005

(30) Foreign Application Priority Data
Apr. 5, 2004    (JP)    ............... 2004-111242

(51) Int. Cl.
*H02K 1/27*    (2006.01)
*H02K 21/24*    (2006.01)

(52) U.S. Cl. .............. 310/54; 310/60 A; 310/61; 310/156.08; 310/156.12; 310/156.32

(58) Field of Classification Search .......... 310/61, 310/156.08, 156.12, 156.32, 156.33, 156.34, 310/156.35, 156.36, 156.37, 216, 254, 268, 310/54, 60 A
See application file for complete search history.

(56) References Cited

U.S. PATENT DOCUMENTS

| | | | | |
|---|---|---|---|---|
| 2,734,140 A * | 2/1956 | Parker | .......... | 310/268 |
| 3,700,944 A * | 10/1972 | Heintz | .......... | 310/168 |
| 5,334,899 A * | 8/1994 | Skybyk | .......... | 310/268 |
| 5,383,265 A | 1/1995 | Nishizawa | | |
| 6,037,696 A | 3/2000 | Sromin et al. | | |
| 6,304,011 B1 * | 10/2001 | Pullen et al. | .......... | 310/52 |
| 6,864,605 B2 * | 3/2005 | Shimizu et al. | .......... | 310/156.12 |

FOREIGN PATENT DOCUMENTS

| | | | |
|---|---|---|---|
| EP | 0 248 912 A1 | | 12/1987 |
| JP | 59112402 A | * | 6/1984 |
| JP | 60-102853 A | | 6/1985 |
| JP | 61-106038 A | | 5/1986 |
| JP | 07-170705 A | | 7/1995 |
| JP | 08-136847 A | | 5/1996 |
| JP | 2003-191882 A | | 7/2003 |
| JP | 2004-174296 A | | 6/2004 |

* cited by examiner

*Primary Examiner*—Karl Tamai
*Assistant Examiner*—David W. Scheuermann
(74) *Attorney, Agent, or Firm*—Foley & Lardner LLP

(57) ABSTRACT

A rotor includes a rotary shaft, a rib provided on the rotary shaft, and a disc-form holding member. The holding member is joined to an axial end face of the rib. The holding member is thereby coupled with the rotary shaft. The holding member is provided with permanent magnets arranged in a circumferential direction. A stator is confronted with the rotor along a central axis of the rotor.

6 Claims, 3 Drawing Sheets

ROTOR STRUCTURE

BACKGROUND OF THE INVENTION

The present invention relates to a rotor structure or assembly for an axial gap motor in which a stator and a disc-form rotor confront each other along a rotary shaft.

Japanese Patent Application Publication No. 2003-1918822 discloses a rotor for an axial gap motor in which a disc-form holding member holding permanent magnets is joined to a rotary shaft by being pressed into the rotary shaft, subjected to a key or serration fit, or fit over the rotary shaft and thereafter welded, so that a relative displacement between the holding member and the rotary shaft in a circumferential direction is restricted.

SUMMARY OF THE INVENTION

If the holding member holding the permanent magnets has a low perpendicularity with respect to the rotary shaft or central axis of the rotor, the rotor forms an uneven gap between the rotor and a stator. The uneven gap causes irregularity in attraction and repulsion between a rotating magnetic field generated by the stator and the rotor, and thereby causes problems in the axial gap motor, such as an unstable torque. Therefore, the axial gap motor needs to enhance the perpendicularity of the holding member with respect to the rotary shaft. However, the holding member of the rotor of the axial gap motor has a considerably small axial thickness as compared to that of a radial gap motor, and therefore cannot provide a sufficient axial thickness at a joint surface between the holding member and the rotary shaft. Therefore, in the rotor structure in which the holding member is pressed into the rotary shaft or fit over the rotary shaft, it is difficult to enhance the perpendicularity of the holding member with respect to the rotary shaft. In this description, to enhance the perpendicularity means to bring an angle of the holding member with respect to the rotary shaft closer to a right angle.

It is an object of the present invention to provide a rotor structure or assembly for an axial gap motor which can enhance a perpendicularity between a holding member and a rotary shaft both composing a rotor.

According to one aspect of the present invention, a rotor assembly for an axial gap motor, includes: a rotor including: a rotary shaft; a rib provided on the rotary shaft; and a disc-form holding member joined to an axial end face of the rib, thereby coupled with the rotary shaft, and provided with permanent magnets arranged in a circumferential direction; and a stator confronting the rotor along a central axis of the rotor.

The other objects and features of this invention will become understood from the following description with reference to the accompanying drawings.

DETAILED DESCRIPTION OF THE INVENTION

Figure 1:
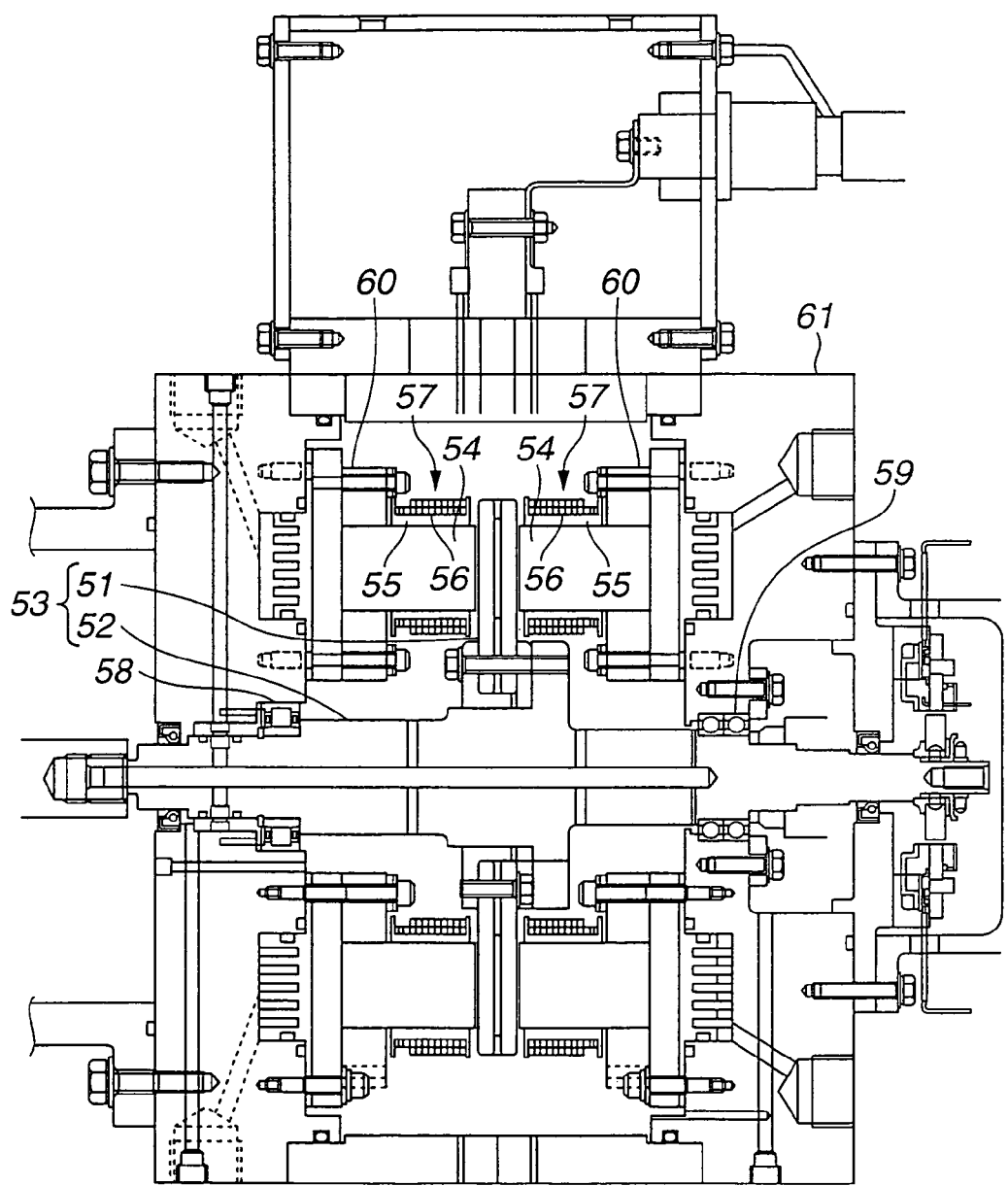
FIG. 1 is a diagrammatic sectional view showing an axial gap motor according to an embodiment of the present invention.

FIG. 1 is a diagrammatic sectional view showing an axial gap motor according to an embodiment of the present invention. The axial gap motor of FIG. 1 includes a rotor 53, a stator 57 and a case 61. Rotor 53 includes a disc-form or circular holding member 51, and a rotary shaft 52. Holding member 51 is provided with permanent magnets arranged in a circumferential direction, and is coupled with rotary shaft 52. Stator 57 confronts rotor 53 along a central axis of rotor 53 or in an axial direction of rotary shaft 52 of rotor 53. Stator 57 includes stator cores 54, insulators 55 and coils 56. Each of coils 56 is wound around stator core 54 between which insulator 55 is disposed. Case 61 supports ends of rotary shaft 52 of rotor 53 rotatably with a radial bearing 58 and a thrust bearing 59, and fixes stator 57 with a guide 60.

Stator cores 54 are disposed around rotary shaft 52 at positions in the circumferential direction of rotary shaft 52. The permanent magnets embedded in holding member 51 of rotor 53 are arranged to have polarities alternating in the circumferential direction. Thus, when each of coils 56 is excited by an inverter, and thereby generates or forms a rotating magnetic field in the circumferential direction, rotor 53 embedded with the permanent magnets having the polarities alternating in the circumferential direction is attracted and repulsed by the rotating magnetic field, and thereby rotates at a synchronous speed.

Figure 2:
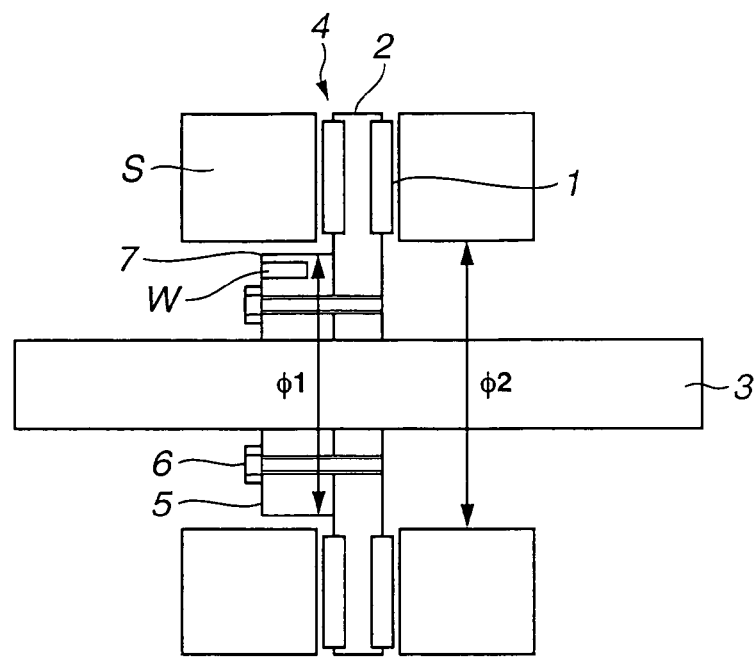
FIG. 2 is a diagrammatic sectional view showing a rotor structure for the axial gap motor according to one embodiment of the present invention.

FIG. 2 is a diagrammatic sectional view showing a rotor structure or assembly for the axial gap motor according to one embodiment of the present invention. The rotor structure of FIG. 2 includes a rotor 4 and a stator S. Rotor 4 includes a disc-form or circular holding member 2, and a rotary shaft 3. Holding member 2 is provided with permanent magnets 1 arranged in a circumferential direction, and is coupled with rotary shaft 3. Stator S confronts rotor 4 along a central axis of rotor 4 or in an axial direction of rotary shaft 3 of rotor 4. Rotor 4 also includes a disc-form or circular rib 5. Rib 5 is fit over rotary shaft 3 by using a key. Rib 5 has a first axial end face and a second or opposite axial end face. The first and second axial end faces form opposite end faces of rib 5 in the axial direction. Holding member 2 is formed with holes each having an internal thread in an inside surface of the hole, and is joined to the first axial end face of rib 5 by bolts 6 being screwed through rib 5 into the respective holes. Thus, holding member 2 is coupled with rotary shaft 3.

Rib 5 has an outside diameter $\phi 1$ smaller than an inside diameter $\phi 2$ of stator S, and is formed with holes 7 in the second axial end face which is the opposite end face of rib 5 from the first axial end face joined to holding member 2. Each of holes 7 is arranged to receive a weight W. Thus, weight W is attached to rib 5.

As mentioned above, rib 5 is fit over rotary shaft 3 by using the key. Besides, rib 5 may be joined to rotary shaft 3 such as by being pressed into rotary shaft 3, subjected to a serration fit, or fit over rotary shaft 3 and thereafter welded. Further, rib 5 may be cast integrally with rotary shaft 3. The first axial end face or joint face of rib 5 to which holding member 2 is joined can be provided with a high perpendicularity such as by being subjected to a cutting work. Thus, the rotor structure of this embodiment can enhance a perpendicularity of holding member 2 with respect to rotary shaft 3. Notably, the rotor structure of this embodiment can enhance the perpendicularity, compared to a structure in which an inner circumferential surface of the holding member is joined directly to the rotary shaft.

Since outside diameter φ1 of rib 5 is smaller than inside diameter φ2 of stator S, stator S can be arranged to overlap an outer circumferential surface of rib 5 without interfering with each other, as shown in FIG. 2. Therefore, even though rib 5 is provided on rotary shaft 3, the rotor structure of this embodiment can realize a gap of a predetermined small width between stator S and rotor 4.

Stator S may be a stator which includes stator cores, insulators and coils, wherein each of the coils is wound around the stator core between which the insulator is disposed, as shown in FIG. 1. Inside diameter φ2 of stator S refers to a minimum inside diameter of such stator including the coils and the insulators.

As described above, rib 5 is formed with holes 7 in the second axial end face opposite from holding member 2. Therefore, the rotor structure of this embodiment can adjust a weight balance or imbalance of rotor 4 by selectively pressing weight W into either of holes 7. Instead of attaching weight W, rib 5 may be subjected to a cutting work to adjust the weight balance or imbalance of rotor 4.

Figure 3:
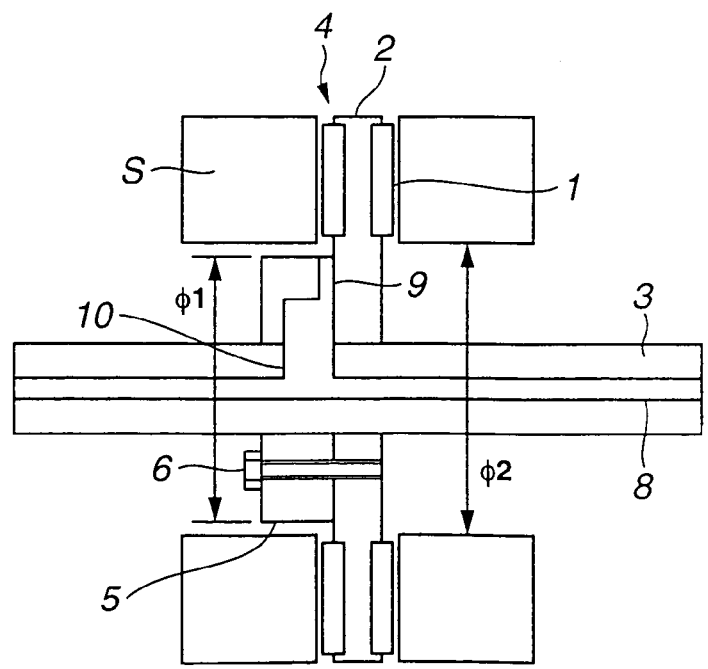
FIG. 3 is a diagrammatic sectional view showing a rotor structure for the axial gap motor according to another embodiment of the present invention.

FIG. 3 is a diagrammatic sectional view showing a rotor structure or assembly for the axial gap motor according to another embodiment of the present invention. In the rotor structure of FIG. 3, rotary shaft 3 is formed with an in-shaft passage 8 extending through rotary shaft 3 in the axial direction of the central axis of rotary shaft 3. Rib 5 is formed with at least one groove in the first axial end face joined to holding member 2. The at least one groove extends radially outward in the first axial end face to form a coolant passage 9 between rib 5 and holding member 2. Rotary shaft 3 is also formed with at least one connecting passage 10 connecting coolant passage 9 with in-shaft passage 8 liquid-tightly.

In this rotor structure, a centrifugal force due to rotation of rotor 4 causes a coolant in in-shaft passage 8 to be supplied via connecting passage 10 and coolant passage 9 to a proximity of the gap formed between rotor 4 and stator S. Thus, the rotor structure of this embodiment is capable of cooling rotor 4 and stator S by utilizing the centrifugal force of rotor 4. Besides, the rotor structure of this embodiment may use any form of substance, such as oil or water, as the coolant.

Since coolant passage 9 is formed between the radially extending groove of rib 5 and holding member 2, the coolant in coolant passage 9 supplied from in-shaft passage 8 by the centrifugal force of rotor 4 directly contacts holding member 2. Thus, the rotor structure of this embodiment is capable of cooling rotor 4 further effectively.

Figure 4:
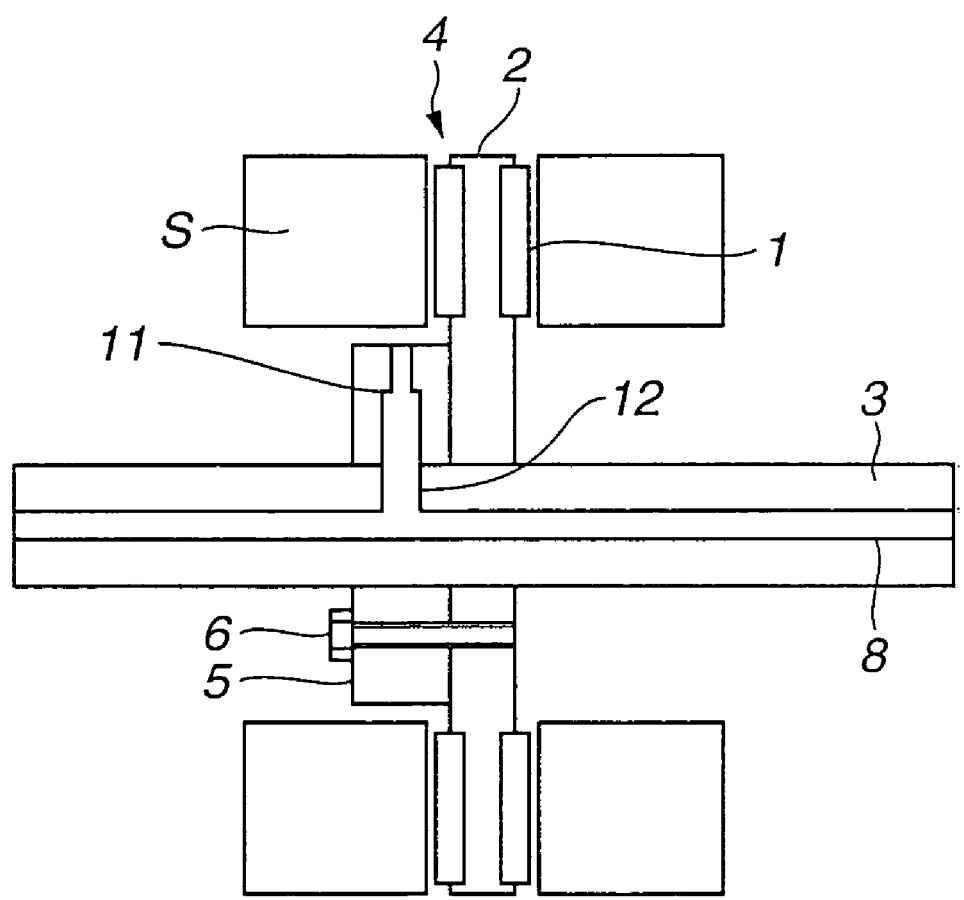
FIG. 4 is a diagrammatic sectional view showing a rotor structure for the axial gap motor according to still another embodiment of the present invention.

FIG. 4 is a diagrammatic sectional view showing a rotor structure or assembly for the axial gap motor according to still another embodiment of the present invention. The rotor structure of FIG. 4 includes rotor 4 and stator S having configurations basically similar to those shown in FIGS. 2 and 3. Thus, elements in FIG. 4 that are identical or equivalent to the elements shown in FIGS. 2 and 3 will not be described in detail in this part of description. In the rotor structure of FIG. 4, rotary shaft 3 is formed with in-shaft passage 8. Rib 5 is formed with at least one coolant passage 11 extending radially outward through inside of rib 5. Rotary shaft 3 is also formed with at least one connecting passage 12 connecting coolant passage 11 with in-shaft passage 8 liquid-tightly.

In this rotor structure, the centrifugal force due to rotation of rotor 4 causes the coolant in in-shaft passage 8 to be supplied via connecting passage 12 and coolant passage 11 to rotor 4 and stator S. Thus, the rotor structure of this embodiment is capable of cooling rotor 4 and stator S by utilizing the centrifugal force of rotor 4. Further, since coolant passage 11 is formed, not on the surface, but inside of rib 5, the first axial end face or joint face of rib 5 to which holding member 2 is joined may be enlarged in area. Thus, the rotor structure of this embodiment allows an easy adjustment of the perpendicularity of the joint face with respect to the central axis, and thus can enhance the perpendicularity of holding member 2 with respect to the central axis.

This application is based on a prior Japanese Patent Application No. 2004-111242 filed on Apr. 5, 2004. The entire contents of this Japanese Patent Application No. 2004-111242 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A rotor assembly for an axial gap motor, comprising:
   a rotor including: a rotary shaft; a rib provided on the rotary shaft; and a disc-form holding member joined to an axial end face of the rib, thereby coupled with the rotary shaft, and provided with permanent magnets arranged in a circumferential direction; and
   a stator confronting the rotor along a central axis of the rotor;
   wherein the rib is formed with holes in an opposite axial end face of the rib from the axial end face, each of the holes being arranged to receive a weight to adjust a weight balance of the rotor; and
   wherein the rib is formed with a coolant passage extending radially outward through the rib; and the rotary shaft is formed with an in-shaft passage extending in the rotary shaft, and a connecting passage connecting the coolant passage with the in-shaft passage liquid-tightly.

2. The rotor assembly as claimed in claim 1, wherein the rib has an outside diameter smaller than an inside diameter of the stator.

3. The rotor assembly as claimed in claim 1, wherein the rib is formed with a groove extending radially outward in the axial end face to form the coolant passage between the rib and the holding member.

4. The rotor assembly as claimed in claim 1, wherein the holding member is formed with a hole having an internal thread in an inside surface of the hole, and is joined to the axial end face of the rib by a bolt being screwed through the rib into the hole.

5. The rotor assembly as claimed in claim 1, wherein the stator includes a stator core, a coil wound around the stator core, and an insulator disposed between the stator core and the coil.

6. An axial gap motor, comprising:
   a rotor including: a rotary shaft forming a central axis of the rotor; a rib provided on the rotary shaft; and a disc-form holding member joined to an axial end face of the rib, and provided with permanent magnets arranged in a circumferential direction;

a stator confronting the rotor along the central axis of the rotor; and a case supporting ends of the rotary shaft rotatably with a radial bearing and a thrust bearing, and fixing the stator with a guide;

wherein the rib is formed with holes in an opposite axial end face of the rib from the axial end face, each of the holes being arranged to receive a weight to adjust a weight balance of the rotor; and wherein the rib is formed with a coolant passage extending radially outward through the rib; and the rotary shaft is formed with an in-shaft passage extending in the rotary shaft, and a connecting passage connecting the coolant passage with the in-shaft passage liquid-tightly.

* * * * *